United States Patent [19]
Schweizer et al.

[11] Patent Number: 5,962,353
[45] Date of Patent: Oct. 5, 1999

[54] HIGH PRODUCTIVITY CERAMIC GLAZE

[75] Inventors: Dieter Schweizer, Dusseldorf; Claudia Sorg, Monheim-Baumberg, both of Germany

[73] Assignee: Hercules Incorporated, Wilmington, Del.

[21] Appl. No.: 08/017,086

[22] Filed: Feb. 12, 1993

[51] Int. Cl.$^6$ .................. C03C 8/00; C03C 8/16
[52] U.S. Cl. ................. 501/20; 501/14
[58] Field of Search .............. 526/200; 501/14, 501/20

[56] References Cited

U.S. PATENT DOCUMENTS

| | | | |
|---|---|---|---|
| 4,845,175 | 7/1989 | Lo | 526/200 |
| 5,238,881 | 8/1993 | Morris | 501/20 |
| B1 4,845,175 | 7/1991 | Lo | 526/200 |

OTHER PUBLICATIONS

Product Data Number 250–11 D, "Natrosol® Hydroxyethlcellulose, A nonionic Water–Soluble Polymer, Physical and Chemical Properties," Aqualon, Wilmington, Delaware, 1994. (No Month).

Product Data Number 4032–3, "Natrosol® Plus CS, Grade 330, Hydrophobically Modified Hydroxyethylcellulose (HMHEC) Personal Care Grade", Aqualon, Wilmington, Delaware, Oct. 1992.

Product Data Number 4061–2, "Natrosol® Plus, HMHEC, Grade 430", Hercules Food & Functional Products, Wilmington, Delaware, Dec. 1994.

Product Data Number 250–18A, "Natrosol® Plus Modified Hydroxyethylcellulose, Performance as a Latex Paint Thickner", Aqualon, Wilmington, Delaware, 1988. (No Month).

Kasper et al., "Compositions for Glazes for Ceramic Substrates", 4 Jul. 1990 –Abstract only.

J.S. Reed, "Introduction to Ceramic Processing Principles", Wiley & Son 1988 pp.434–438. (No Month).

*Primary Examiner*—Michael Marcheschi
*Attorney, Agent, or Firm*—David Edwards

[57] ABSTRACT

A sanitary ceramic glaze with improved drying and leveling properties contains a thickening amount of a hydrophobically modified hydroxyethylcellulose with a M.S. of 1.5 to 4.5 and a weight percent hydrophobic modification between 0.1 and 2.0.

7 Claims, No Drawings

HIGH PRODUCTIVITY CERAMIC GLAZE

FIELD OF THE INVENTION

This invention relates to a glaze for ceramic articles. In particular the invention relates to a high productivity ceramic glaze for sanitary ceramic articles.

BACKGROUND OF THE INVENTION

Hydrophobically modified hydroxyethylcellulose is known from U.S. Pat. No. 4,228,277 to be a clear effective thickener in latex paint compositions and shampoos. Since the time of the initial discovery of these associative thickeners, additional applications have been discovered such as paper coating compositions, etc.

Ceramic greenware can be decorated and coated with a variety of glazes prior to firing. When sanitary ceramic articles are produced, the glaze must meet the same exacting requirements as for decorative ceramic articles. Sinks and toilets must be fired using glazes meeting sanitary requirements and be suitable for extended service.

Cellulose ethers and xanthan gums have been used as thickeners and binders for such sanitary ceramic glazes. Upon firing, these polysaccharides decompose and form the glaze glass and metal oxide deposit on the ceramic article. Varial® ceramic glaze, for example, is a blend of approximately 20% xanthan gum with 80% sodium polyphosphate, available from Chemische Werk Tübingen of Germany.

A particularly useful sanitary ceramic glaze comprises feldspars, clays, kaolin, quartz metal oxides and frits all together called ceramic raw materials. These ceramic raw materials are suspended in water and stabilized by a mixture of xanthan gum and sodium polyphosphate. Yet even with its advantages and demonstrated utility there were problems of high cost and limited workability. It remained for the present invention to provide a high value in use of sanitary ceramic glaze which could overcome the disadvantages of the prior art.

SUMMARY OF THE INVENTION

The present invention provides a sanitary ceramic glaze comprising a thickening amount of a hydrophobically modified hydroxyethylcellulose having a hydroxyethyl Molar Degree of Substitution (M.S.) between 1.5 and 4.5 and a weight percent hydrophobic modification between 0.1 and 2.0.

A preferred ceramic glaze comprises in percent by weight water 20 to 60, ceramic raw material 40 to 80, hydrophobically modified hydroxyethylcellulose 0.05 to 2.0, sodium polyphosphate optional 0 to 10, and preservative 0.01 to 0.2.

The advantages provided with the use of the glaze include lower cost, shorter drying time, improved sag and run resistance, reduced foam formation (reduced pinholes), and greater binder resistance. The glaze is storage stable for up to 3 to 4 months and has a yield value, i.e., high viscosity at zero shear.

DETAILED DESCRIPTION OF THE INVENTION

It has been discovered that a superior rheology of a ceramic glaze can improve productivity for sanitary products in particular. Of advantage is a yield point to prevent or reduce settling. For the flow characteristics, pseudoplasticity at high shear is desired to reduce wear of equipment especially for spray application. The unique properties for the glaze are provided by suitable grades of hydrophobically modified hydroxyethylcellulose.

Suitable materials are available from the Aqualon Company as Natrosol® Plus HM hydroxyethylcellulose. In particular, grades 330 and 430 have demonstrated outstanding results in this particular application. Other suitable materials include Spatterguard® hydrophobically modified hydroxyethylcellulose from Union Carbide and Bermocol® EH 100 hydrophobically modified ethylhydroxyethylcellulose from Berol Nobel.

The properties provided by these cellulose ethers modified with alkyl or arylalkyl hydrophobes include a yield point to prevent or reduce sedimentation of glaze, thixotropy, stabilization against microbiological attack and stability against dispersants such as borax.

Several terms, definitions and physical measurements in common use within the ceramic industry have meanings and applications which require explanation for lay persons. Glue, for instance, is a general term for a binder. Sedimentation behavior refers to the stability of the glaze to suspend the ceramic raw materials. Casson or Bingham shear thinning bodies refer to the rheology of a system which is pseudoplastic once flow commences after the yield point.

Pinholes in the surface of the fired sanitary articles are caused by foam bubbles. These unsatisfactory articles must be recoated and refired to correct this problem. However, productivity is increased using the glazes of the invention because a thicker glaze coating can be applied which exhibits superior flow, thus producing fewer pinholes than the glazes of the prior art.

Glazes containing these cellulose ethers modified with aryl and arylalkyl hydrophobes can be applied by spraying or dripping to provide a thicker but faster drying coating with improved leveling and superior run and sag resistance. In addition, less pinholes are observed. The glazes have a yield point which prevents settling due to sedimentation. A further advantage is the microbiological stability of these cellulose ethers and their high tolerance to borax which is often used in the glazes as a dispersant. While it is not known with certainty, it is believed that the associative nature of these hydrophobically modified cellulose ethers allows higher glaze structure to occur, but with less water binding power, which permits water to transfer more rapidly into the ceramic article.

Typical ingredients for a ceramic glaze in use prior to the present invention included ceramic raw materials suspended in a viscosifying mixture of xanthan gum and sodium polyphosphate. After firing, a white or colored protective surface remained on the ceramic material.

The new binder gives the glaze "Stehvermögen" which is the German word to define the new and useful properties of the invention. Expressed in English this means a thick viscous glaze with the properties of good leveling and sag and run resistance which contribute to high productivity and lower rework.

The invention has industrial applicability in the field of ceramics manufacture. The following Preparations and Examples illustrate the practice of the invention, without being limiting.

PRIOR ART PREPARATION

The following ingredients were mixed in order to prepare a glaze suitable for sanitary ceramic articles or decorative tile.

| | |
|---|---|
| Water | 35 g |
| Ceramic raw material | 65 g |
| Xanthan gum | 0.2 g |
| Sodium polyphosphate | 0.8 g |

The glaze had a flow viscosity of 5000 mpas at a shear rate of 10 $Sec^{-1}$ and a viscosity of 825 mPas at a shear rate of 100 $Sec^{-1}$.

INVENTION PREPARATION

The following ingredients were mixed in order to prepare a glaze suitable for sanitary ceramic articles or decorative tile.

| | |
|---|---|
| Water | 35 g |
| Ceramic raw materials | 65 g |
| Natrosol ® Plus 430 HMHEC available from Aqualon | 0.21 g |
| Sodium Polyphosphate | 0.83 g |

The glaze had a flow viscosity of 9400 mPas at a shear rate of 10 $Sec^{-1}$ and a viscosity of 868 mPas at a shear rate of 100 $Sec^{-1}$.

EXAMPLE 1

A variety of sanitary ceramic manufactured articles (toilets, sinks, bathtubs) were sprayed with both the Prior Art Preparation (controls) and the Invention Preparation (experiment). A visual comparison of these tests revealed that the experimental materials dried faster and provided a thicker glaze coating which displayed a lower tendency to run or sag as well as containing fewer foam bubbles.

Article sprayed with the Invention Preparation dried in from 1 to 1.5 minutes compared with from 2 to 3 minutes for articles sprayed with the Prior Art Preparation. These articles could thus be handled sooner and placed in the oven sooner for firing. In addition fewer fired articles sprayed with the Invention Preparation contained objection pinholes or runs such that rework was required wherein the article was again sprayed, dried and fired to eliminate defects.

EXAMPLE 2

Unglazed ceramic tiles were both dipped and sprayed with control and experimental ceramic glazes. When the glazes had dried, these samples were fired in a 1000–1400° C. oven for 0.5 to 4 hours.

Visual inspection of both the control and experimental tiles revealed overall superior quality for the glaze containing hydrophobically modified hydroxyethylcellulose associative thickener.

What is claimed is:

1. A ceramic glaze comprising 20 to 60% by weight of water, 40 to 80% by weight of ceramic raw materials selected from the group consisting of feldspars, clays, kaolin, quartz, metal oxides, and frits and a thickening amount of a hydrophobically modified cellulose ether having a weight percent hydrophobic modification between 0.1 and 2.0.

2. The ceramic glaze of claim 1 where the cellulose ether is hydroxyethylcellulose or ethylhydroxyethylcellulose.

3. The ceramic glaze of claim 1 where the cellulose ether is hydroxyethylcellulose.

4. The ceramic glaze of claim 3 where hydroxyethyl molar substitution (M.S.) of the hydroxyethylcellulose is between 1.5 and 4.5.

5. The ceramic glaze of claim 4 containing on a weight percent basis:

| | |
|---|---|
| Water | 30–40 |
| Ceramic raw materials | 60–70 |
| hydrophobically modified hydroxyethylcellulose | 0.1–0.5 |
| Sodium Polyphosphate | 0–10 |

6. A process for glazing sanitary ceramic articles selected from the group consisting of toilets, sinks and bathtubs comprising the steps a. spraying an unglazed ceramic article with an aqueous glaze of (i) 40 to 80% by weight of ceramic raw materials selected from the group consisting of feldspars, clays, kaolin, quartz, metal oxides, and frits, (ii) a thickening amount of a hydrophobically modified hydroxyethylcellulose, and (iii) optional sodium polyphosphate, b. drying until the article can be handled without marring the surface glaze, and c. firing to produce a glazed sanitary ceramic article.

7. The process of claim 6 where the glaze has a percent solids of 40 to 80 and a flow viscosity of 4000–10000 mPas at a shear rate of 10 $Sec^{-1}$ and a viscosity of 700–1000 at a shear rate of 100 $Sec^{-1}$ at 20° C.

* * * * *